(12) United States Patent
Katagiri (10) Patent No.: US 6,389,544 B1
(45) Date of Patent: May 14, 2002

(54) POWER MONITORING METHOD FOR A PRINTER OR OTHER PERIPHERAL DEVICE, POWER MONITORING APPARATUS, SOFTWARE PROGRAM AND INFORMATION RECORDING MEDIUM

(75) Inventor: Masahiro Katagiri, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/322,263

(22) Filed: May 28, 1999

(30) Foreign Application Priority Data

Jun. 1, 1998 (JP) .......................... 10-151430

(51) Int. Cl.⁷ ............................... G06F 1/28
(52) U.S. Cl. ................. 713/300; 713/340; 714/815
(58) Field of Search .................... 713/300, 310, 713/330, 340; 714/37, 47, 44, 55, 736, 815

(56) References Cited

U.S. PATENT DOCUMENTS

| | | | | |
|---|---|---|---|---|
| 4,635,195 A | * | 1/1987 | Jeppesen et al. | 713/330 |
| 4,663,539 A | * | 5/1987 | Sharp et al. | 713/310 |
| 4,677,566 A | * | 6/1987 | Whittaker et al. | 713/324 |
| 5,706,411 A | | 1/1998 | McCormick | |

FOREIGN PATENT DOCUMENTS

| | | |
|---|---|---|
| EP | 0 652 533 A2 | 5/1995 |
| JP | 56-147214 | 11/1981 |
| JP | 3-12722 | 1/1991 |
| JP | 9-185575 | 7/1997 |

OTHER PUBLICATIONS

IBM Technical Disclosure Bulletin vol. 34, No. 8, Jan. 1992 Limited Tolerance to Poll Response Delays pp. 278–279.

* cited by examiner

Primary Examiner—Xuan M. Thai
(74) Attorney, Agent, or Firm—Mark P. Watson (57) ABSTRACT

Peripheral device, specifically a printer, power on/off status is monitored on the host computer to prevent an erroneous operation resulting from printer resets caused by printer power being turned off and on. A printer power monitoring method implemented in a host computer monitors printer power supply status in a printer capable of sending to the host computer status information resulting from a change in printer status, including a drop in printer power supply voltage below a specific threshold level. The printer power monitoring method has a step of receiving status information sent from the printer; a step of requesting current status information from the printer after the printer status information has been received; and a step of determining that printer power is off if a response to the current status information request is not received.

25 Claims, 6 Drawing Sheets

POWER MONITORING METHOD FOR A PRINTER OR OTHER PERIPHERAL DEVICE, POWER MONITORING APPARATUS, SOFTWARE PROGRAM AND INFORMATION RECORDING MEDIUM

BACKGROUND OF THE INVENTION

1. Field of the Invention

The present invention relates to a power monitoring method and apparatus for monitoring a power status of a printer or other peripheral device, and relates particularly to a power monitoring method and apparatus for a printer or peripheral device having a function for passing status information to a host computer when there is a change in the printer status, including a drop in the printer power supply voltage below a specified threshold level. The present invention also relates to a software program for implementing the power monitoring method and media on which the program is recorded or carried.

2. Description of the Related Art

Data processing terminals such as point-of-sale (POS) and electronic cash register (ECR) terminals are today commonly equipped with a printer that is connected to a host computer and is controlled based on commands and print data received from the host computer. The host computer in such applications typically controls printer operation based on printer status information received from the printer. This status information enables the host to determine the current operating status of the printer, and includes, for example, the printer power supply voltage, the print head position, whether there is paper in the printer, whether the printer cover is open or closed, and whether paper is being advanced.

The printer also generally has its own power supply that is independent of the host computer power supply. The printer starts and stops operating when the user turns the printer power switch on and off, respectively.

Once printer power has been turned on, the host computer typically cannot determine if the user has thereafter turned printer power off. As a result, the host will continue to send print data to a printer even after that printer has been turned off. The turned-off printer cannot receive or process the data and thus the transferred print data will not be printed. The host computer will typically be unaware of this print error.

In addition, when a printer that has been turned off is then turned on again, the on/off operation causes the printer to reset so that it can again receive print data from the host. Printer settings are thus reinitialized. As a result, print data that is sent to the printer after it is turned back on, based on the printer settings before the printer power was turned off, may not be printed with the expected results.

It should be noted that the host computer can be designed to regularly poll the on/off status of the printer, but to effectively eliminate the above-noted problems this monitoring operation must be frequently repeated. This reduces host computer throughput.

It is also possible to design the printer so that the printer sends information notifying the host that printer power has been turned off and then on again. This, however, means adding functionality to the printer, and thus cannot be effectively implemented in existing printers.

On the other hand, if a power monitoring function can be designed whereby the host can determine the power on/off status of the printer with a change in the host computer functionality but without any change in function on the printer side, product design is made easier, and the power monitoring function can be widely deployed even with existing printers.

OBJECTS OF THE INVENTION

Therefore, it is an object of the present invention to overcome the aforementioned problems. In the following discussions, reference will be made to a printer for the sake of ease of understanding. However, the present invention is equally applicable to other peripheral devices such as display devices and scanners.

With consideration given to the above-noted problems, it is therefore an object of the present invention to provide a printer power monitoring function and apparatus whereby printer power status can be determined by the host computer, thereby enabling printing to be completed normally even when a printer that is in use is reset by being turned off and then on again.

A further object of the present invention is to enable normal printing with existing printing systems by changing functionality on the host computer side and requiring no change in function of existing printers.

Another object of the invention is to provide a software program for performing the method of the present invention. The software program can be stand-alone, resident on the host computer, recorded on media readable by the host computer or embodied on a carrier wave that can be input to the computer.

SUMMARY OF THE INVENTION

To achieve the above objects, a printer power monitoring method according to the present invention is for use in a host computer for monitoring the power supply status of a printer having a capability of sending to the host computer status information resulting from a change in printer status where this status information includes a drop in printer power supply voltage below a specific threshold level. This printer power monitoring method comprises: a step of receiving status information sent from the printer; a step of requesting current status information from the printer after the printer status information has been received; and a step of determining that printer power is off if a response to the current status information request is not received.

When printer power is turned off by the user, the printer supply voltage decreases gradually over a known period of time. This period of time in which the voltage level decays can be determined empirically for any given printer model and will depend on, for example, the capacitance of the printer's power supply circuits. The rate of voltage decrease will be maximum (and thus the time period to zero voltage will be the shortest) when the printer is in a high-load state, e.g. during printing, and the rate of decrease will be minimum (and thus the time period to zero voltage will be the longest) when the printer is in a low-load state, e.g. standby mode. When the supply voltage drops below a predetermined threshold level, the printer sends a printer status information report indicating a power supply error, for example, to the host, thus informing the host that a non-recoverable error has occurred. When the host receives this report, it sends a current status information request to the printer. If the printer status information was sent to the host computer because the power was turned off, printer power will be completely off when the status information request is received from the host computer, and the printer will not be able to respond to the request. Therefore, if the host does not receive a response, it can determine that printer power is off.

The step of requesting current status information from the printer is preferably performed after a delay period equivalent to at least the time required for printer power to completely turn off (i.e. power supply voltage equaling zero or nearly zero) after the printer power supply voltage drops below a specific threshold level.

The printer power monitoring method of the invention preferably further comprises a step of evaluating received status information content following the step of receiving status information sent from the printer. In this embodiment, the step, of requesting current status information from the printer is performed only when the received status information content relates to a non-recoverable error, including a drop in printer power supply voltage below a specific threshold level.

Alternatively, in the printer power monitoring method of the present invention, the host computer can make a printer power off determination without performing the step of requesting current status information from the printer when the status information bit stream is not received in its entirely in the step of receiving status information sent from the printer. In this situation, it is assumed that the printer's failure to send complete status information is the result of power being turned off and the voltage level dropping too quickly for the printer to complete its status transmission.

Yet further preferably, the printer power monitoring method according to the present invention additionally comprises a step of monitoring that power is turned back on after the step of determining that printer power is off.

In this embodiment, the step of monitoring that power is turned on comprises: a step of requesting current status information from the printer; and a step of determining that printer power is on if a response to the current status information request is received.

The step of requesting current status information from the printer can alternatively be performed just before the host computer sends data to the printer.

Yet further alternatively, the step of requesting current status information from the printer can be repeated at a specific time interval.

The present invention also includes a power monitoring apparatus disposed in a host computer for monitoring a power supply status in a printer having the capability of sending to the host computer status information resulting from a change in printer status, including a drop in printer power supply voltage below a specific threshold level. This printer power monitoring apparatus comprises: a receiving unit that receives status information sent from the printer; a status information request generator that requests current status information from the printer after the printer status information has been received; and an evaluation unit that determines that printer power is off if a response to the current status information request is not received.

The present invention also includes a printer operating according to control commands and print data from a host computer. This printer comprises: a supply voltage detector that detects a printer power supply voltage; a notification unit that communicates status information to the host computer immediately after a change in printer status occurs; and an execution unit that runs in real time, without storing to a buffer, a specific command from the host computer. The notification unit notifies the host computer when the supply voltage detector detects that the printer power supply voltage is below a specific threshold level, and the execution unit sends status information in response to a real-time command from the host computer requesting printer status information.

The printer normally monitors a drop in the supply voltage and notifies the host computer of a voltage drop even when a status request is not received from the host computer. When the host computer receives such a voltage drop notification, it sends a real-time command to the printer requesting current printer status information, and can determine whether printer power is on or off based on whether a response to the real-time command is received from the printer.

The present invention further includes a software program for implementing the power monitoring control method of the present invention. The software program may be stand-alone, resident on the host computer, recorded on media readable by the host computer or embodied in a carrier wave that can be input to the host computer.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

The preferred embodiments of the present invention are described below with reference to the accompanying FIGS.

Figure 1:
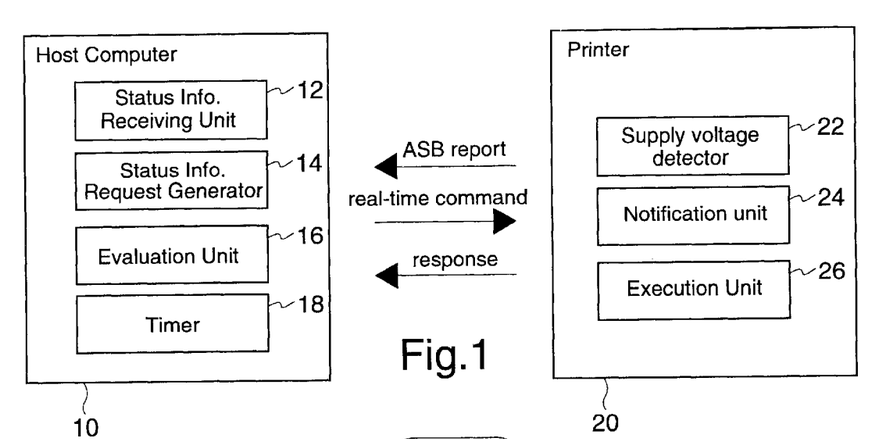
FIG. 1 illustrates data communication between a printer and a host computer according to the present invention.

FIG. 1 illustrates data communication between a printer and a host computer according to the present invention. Although the FIGS. and description refer to a printer for ease of understanding, the present invention is applicable to other peripheral devices such as display devices and scanners. In an exemplary point-of-sale (POS) system, the host computer 10 and the printer 20 for printing receipts, for example, are connected via an RS-232C or other interface, enabling two-way communication between the host computer 10 and printer 20. FIG. 1 shows some of the components of the host computer 10 and printer 20 most relevant to the present invention. Host computer 10 includes a status information receiving unit 12, status information request generator 14, evaluation unit 16, and timer 18. Printer 20 includes a supply voltage detector 22, notification unit 24 and execution unit 26. Of course, each of host computer 10 and printer 20 will conventionally include many other functional units, which are omitted from the figures for ease of understanding and the details of which are not necessary for an understanding of the present invention. Printer 20 will include, for example, a platen, print head, carriage, paper storage, CPU, memory, etc. The notification unit 24 and execution 26, for example, may actually comprise portions of other functional units such as the CPU and memory, but are shown herein as separate functional blocks for ease of explanation.

Figure 7:
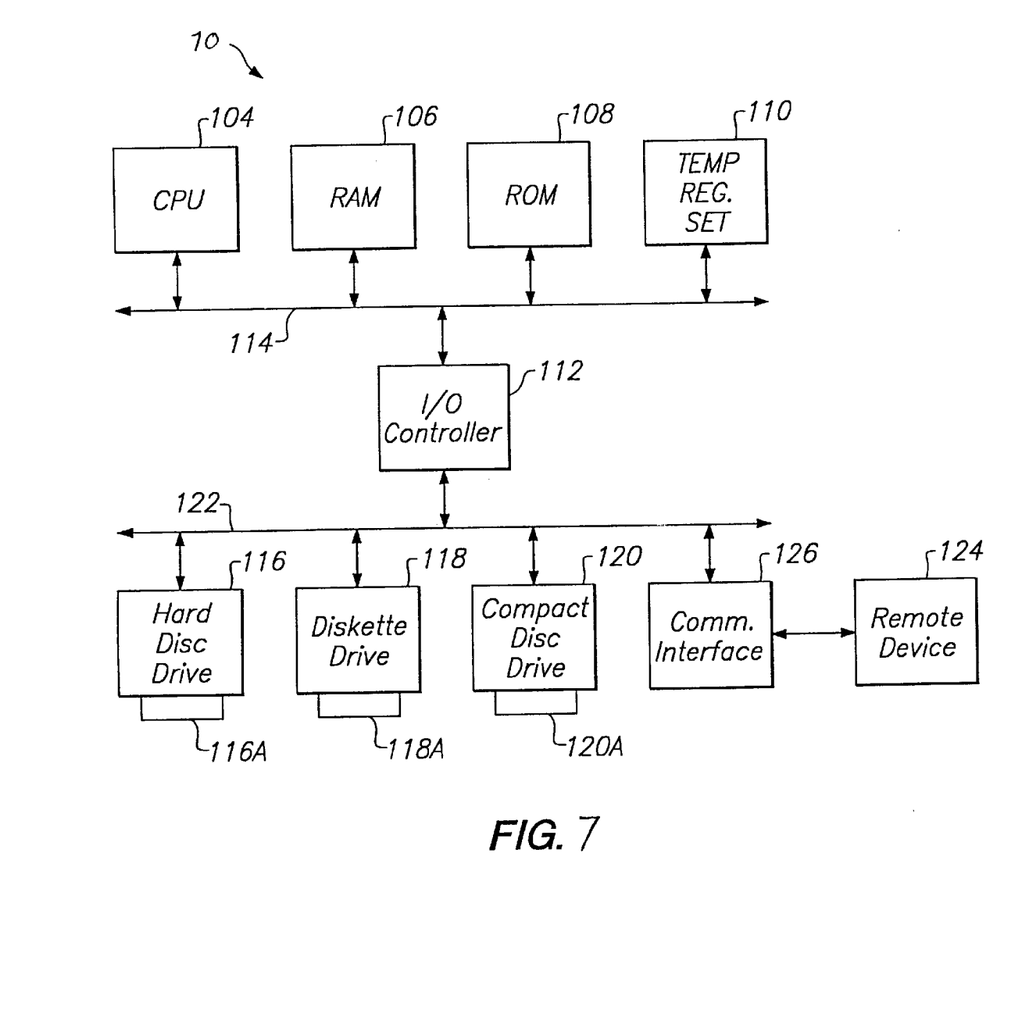
FIG. 7 is a block diagram of the major functional units of the host computer of the present invention.

As shown in FIG. 7, host computer 10 may further include, for example, a central processing unit (CPU) 104, memories including a random-access-memory (RAM) 106, read-only memory (ROM) 108 and temporary register set 110, and an input/output controller 112; all connected to an internal bus 114. Although for the sake of illustration each of the above units are shown separately, it will be appreciated that these units may be implemented with discrete components, application specific integrated circuits, processors executing appropriate software and the like or any combination thereof. Additionally, it will be appreciated that the functional units shown in FIG. 1, e.g. evaluation unit 16, may actually comprise one or more of the functional units shown in FIG. 8, e.g. CPU 104 and RAM 106. As another example, although timer 18 is shown as a functional block in FIG.1, it may actually comprise a variety of components including a real-time-clock, counters, registers, etc., as is well known in the art.

Operating system software and/or application specific software for operating the host computer 10 and/or the printer 20 and/or the various functional units described herein may be stored in any combination of the memories 106, 108 and 110 or may be stored externally in one or more of the I/O units including hard disc drive unit 116, diskette drive unit 118, and compact disc drive 120, each connected to I/O Bus 122. Software for operating the various functional units and/or for implementing the method of the present invention may be stored on a medium such as hard disc 116A, diskette 118A or compact disc 120A, or may be stored at a remote device 124 and input through communications interface 126. The software program for performing the method of the present invention may be embodied on a carrier wave and input to the host computer through communications interface 126. The remote device may be the internet or a network such a local network (LAN) or wide area network (WAN), for example. The remote device 124 may also include the printer 20 and the communications interface may include an RS-232C port, for example, enabling two-way communication between the host computer and printer.

The printer 20 has an Automatic Status Back (simply called "ASB" below) function for automatically sending printer status reports to the host computer 10 without waiting for a status information request from the host computer 10. The type or nature of status information that is returned to the host computer 10 by the ASB function is preset by the host computer 10 in the printer 20. When there is a change in status of any printer function or monitored event that is reported by the ASB function, the printer 20 automatically sends an ASB report to the host computer 10. By thus automatically receiving status information from the printer 20, the host computer 10 can send command and print data and control the printer 20 based on the information included in the ASB reports without specifically requesting status information from the printer 20.

Exemplary status information that is sent by the ASB function includes:

abnormal voltage errors, CPU execution errors, problems with the print head temperature detection thermistor, print head home position detection errors, printer cover open errors, carriage adjustment error, and other types of error information. Error information included in this status information can be divided into three groups based on differences in the ability of the printer to recover from the error. These three groups are automatic recovery errors, recoverable errors, and non-recoverable errors. When one of these printer errors occurs, the host computer is notified of the error by the printer setting a specific bit in the data comprising the status information report.

An abnormal voltage error, such as when the printer 20 supply voltage drops below a threshold voltage at which normal printer operation can be impaired, is one example of a non-recoverable error. When an abnormal voltage error occurs, the host computer 10 is notified both that an abnormal voltage error has occurred and the error is non-recoverable by setting appropriate bits in the ASB report. It should be noted that in this exemplary embodiment the ASB report comprises a 4-byte (32-bit) data stream, and bits for non-recoverable errors are stored in byte 2.

As explained above, the host computer 10 receives ASB reports from the printer 20. In addition, the host computer 10 has a real-time status request function for sending a real-time command to the printer 20 instructing the printer 20 to return the current status information. The real-time command sent from the status information request generator 14 of the host computer 10 and received by the execution unit 26 of printer 20 is processed by the execution unit 26 before or instead of being stored in a buffer. The real time command is thus processed with priority over other commands and print data. When the printer 20 receives this real-time command, it responds by immediately returning the current printer status information.

A host computer 10 according to the present invention uses the printer status information sent to the host computer 10 by the printer's ASB function, and the printer response to real-time commands sent from the host to the printer to monitor when the printer 20 power has been turned off. This is to detect the printer power on/off status without a time delay.

Figure 2:
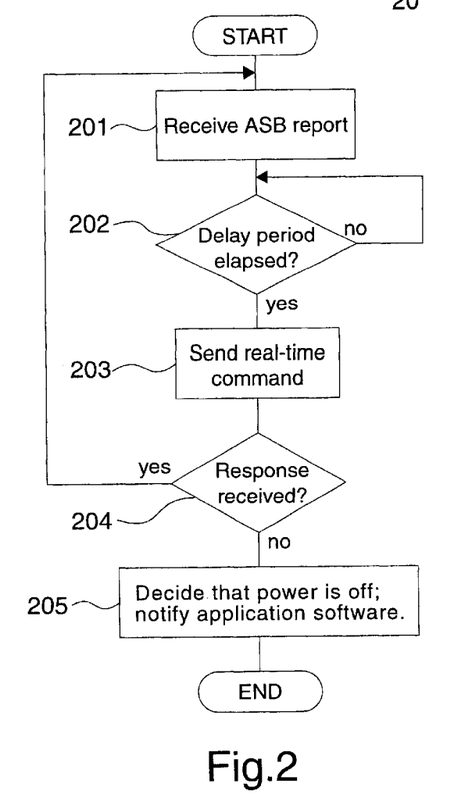
FIG. 2 is a flow chart of a power monitoring method according to a first embodiment of the present invention.

FIG. 2 is a flow chart that shows steps of the power monitoring method of this first preferred embodiment of the invention. By implementing the steps of this procedure, the host computer 10 detects that printer power has been turned off, and notifies the application software running on the host computer accordingly. This is described in detail below.

When a printer 20 is in use and the user then turns the printer power off, a supply voltage drop is detected by the supply voltage detector 22 of the printer when the supply voltage has decreased below a certain threshold level but before it has decreased to zero or a level at which the printer becomes completely inoperative. As a result, the notification unit 24 of the printer 20 that performs the ASB function sends an ASB report to the host computer 10 to report a non-recoverable error. After the host computer 10 receives this ASB report (step 201), it waits for a specific delay period (202), and then sends a real-time command to the printer 20 to request current status information from the printer (203).

Figure 6:
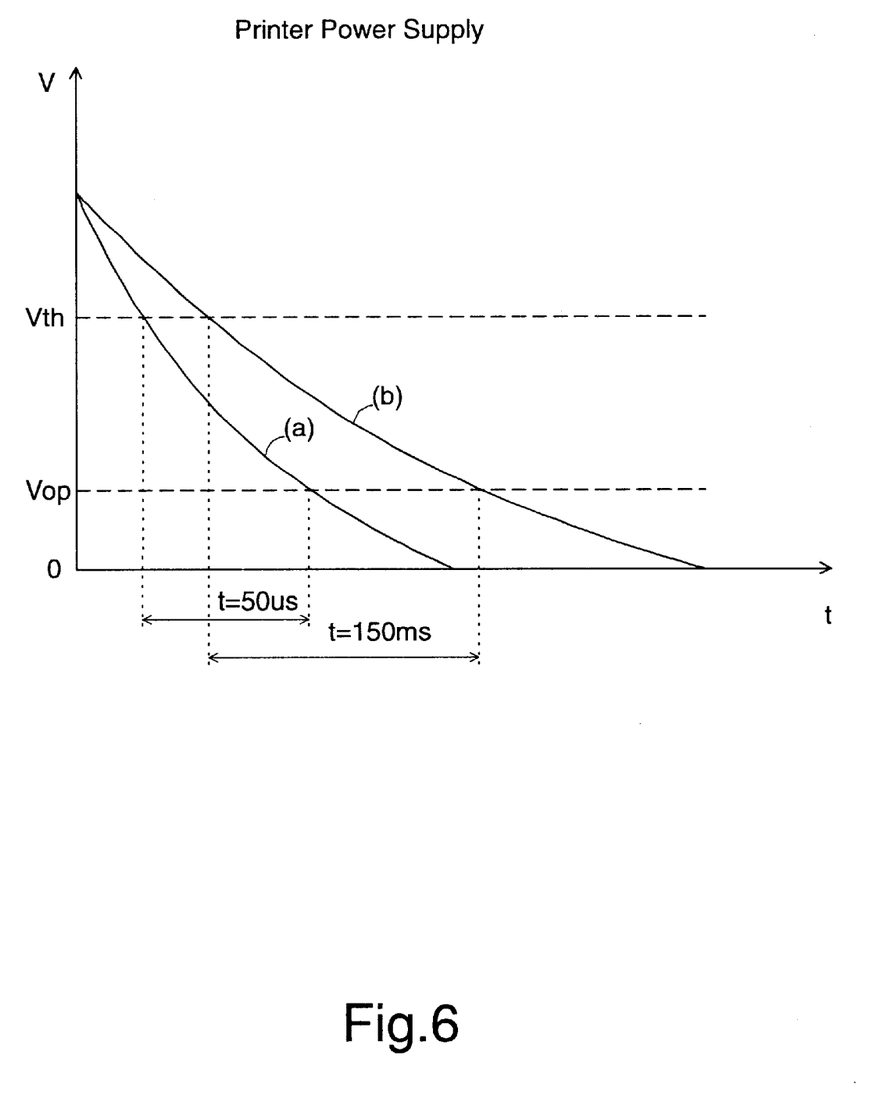
FIG. 6 illustrates the printer power supply voltage decay over time once the printer is turned off.

FIG. 6 illustrates the printer power supply voltage decay following the printer being turned off. As stated above, the host computer 10 waits a specific delay period in step 202 before the real-time command is sent in step 203. This delay period must be long enough for the supply voltage of the printer to drop from the threshold level (Vth), at which point the non-recoverable error is reported to the host, to a level (Vop), at which point the printer becomes inoperative. This delay period or time will vary according to the printer operational status when the power switch was turned off. For example, if the printer is in a high load state, i.e. line (a) in FIG. 6, because printing is in progress when the power is turned off, the voltage decay rate is maximum and the delay time is relatively short, e.g. approximately 50 micro-seconds in an exemplary printer. On the other hand, if the printer is in a low load state, i.e. line (b) in FIG. 6, such as a standby mode, when the power is turned off, the decay rate is minimum and the delay time will be relatively long, for example approximately 150 ms. As a result, the delay period of step 202 is selected to be preferably greater than 150 ms for the printer model of this example. Such a delay period assures a reliable detection of whether or not the printer is turned off. This delay period or time is determined empirically for each printer model and is included in the host computer's memory during initial printer set-up. It is to be noted that the delay period should not be much longer than is necessary to achieve a reliably detection, because an unnecessary late detection of the printer-off-status might jeopardize the aim of the invention to prevent misprinting.

If the printer's ASB function sends an ASB report to the host computer 10 because the printer 20 voltage level was reduced as a result of power being turned off, the printer 20 power will be completely off by the time the host computer 10 sends the real-time command to the printer 20. The printer 20 will therefore not be able to receive and answer the real-time command. If the host computer 10 does not receive a response to the real-time command from the printer 20 within a predetermined period after sending the real-time command (204), the host computer 10 can decide that the printer power is off, and so notify the application software running on the host computer (205).

As described above, the ASB function of the printer 20 can also send ASB reports for other reasons, including paper jam errors. In this case, the printer 20 returns a status information report when a real-time command is received from the host computer 10. The host computer 10 can therefore determine that printer 20 power is not off.

Figure 3:
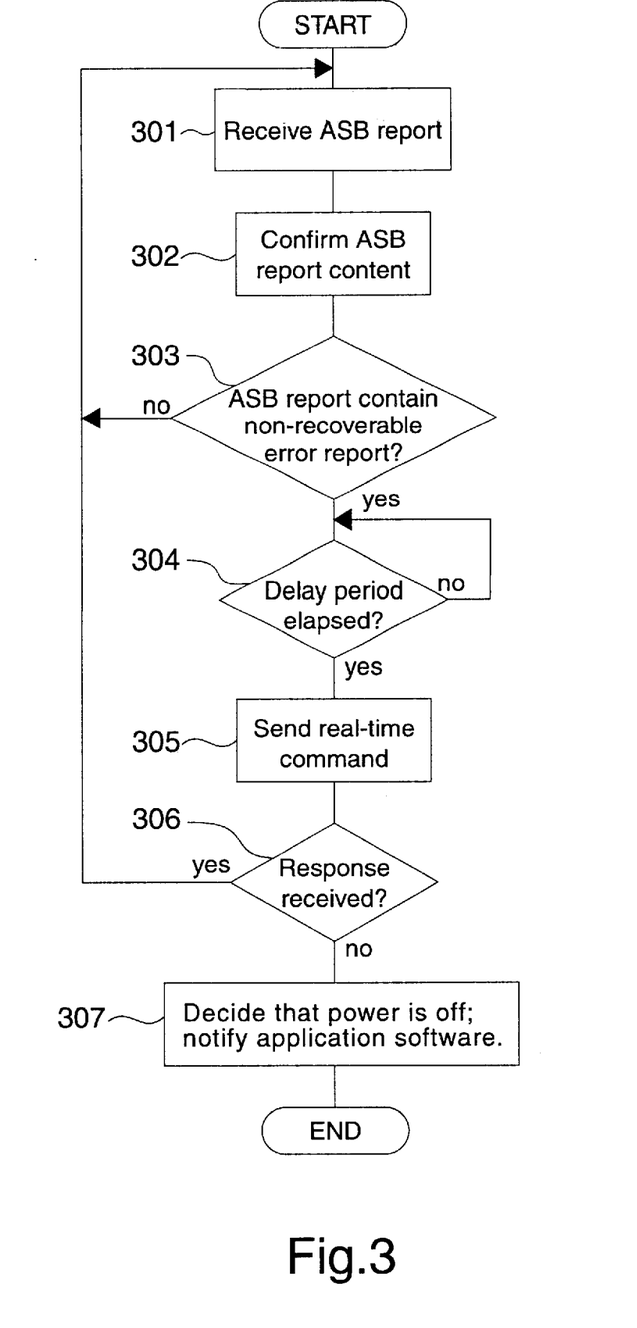
FIG. 3 is a flow chart of a power monitoring method according to a second embodiment of the present invention.

FIG. 3 is a flow chart of a power monitoring method according to a second preferred embodiment of the present invention. This method differs from that of the first embodiment in that a further step is provided for evaluating the content of the ASB report before sending a real-time command to the printer. This is described in further detail below.

When the printer 20 is in use and the user then turns the power printer off, or some other status-changing event occurs, the ASB function of the printer 20 sends an ASB report to the host computer 10 reporting an error as in the first embodiment. After the host computer 10 receives this ASB report (301), it reads the status information included in the ASB report (302). The host computer 10 then determines whether the non-recoverable error bit is set in the ASB report (303). This function is performed by the evaluation unit 16 of the host computer.

If the non-recoverable error bit is set, indicating that the ASB report was sent because of a non-recoverable error, the host computer 10 waits for the specific delay period (304), and then sends a real-time command to the printer 20 (305) as described above for the first embodiment.

However, if the non-recoverable error bit is not set in step 303, indicating that the ASB report was not sent due to a non-recoverable error, the host computer 10 knows that the printer 20 power is not off. The host computer 10 therefore waits for the next ASB report.

The power monitoring method according to the second embodiment therefore does not send a real-time command to the printer when an ASB report is received from the printer 20 if the report is not due to a non-recoverable error. Unnecessary transmission of real-time commands is thus avoided, and an increase in processing demands imposed on the host computer and printer by sending and responding to such commands is thus also avoided.

Also as in the first embodiment, if the host computer 10 does not receive a response to the real-time command sent in step 305 within a predetermined period (306), it determines that printer power is off, and so notifies the application software running on the host computer (307).

Figure 4:
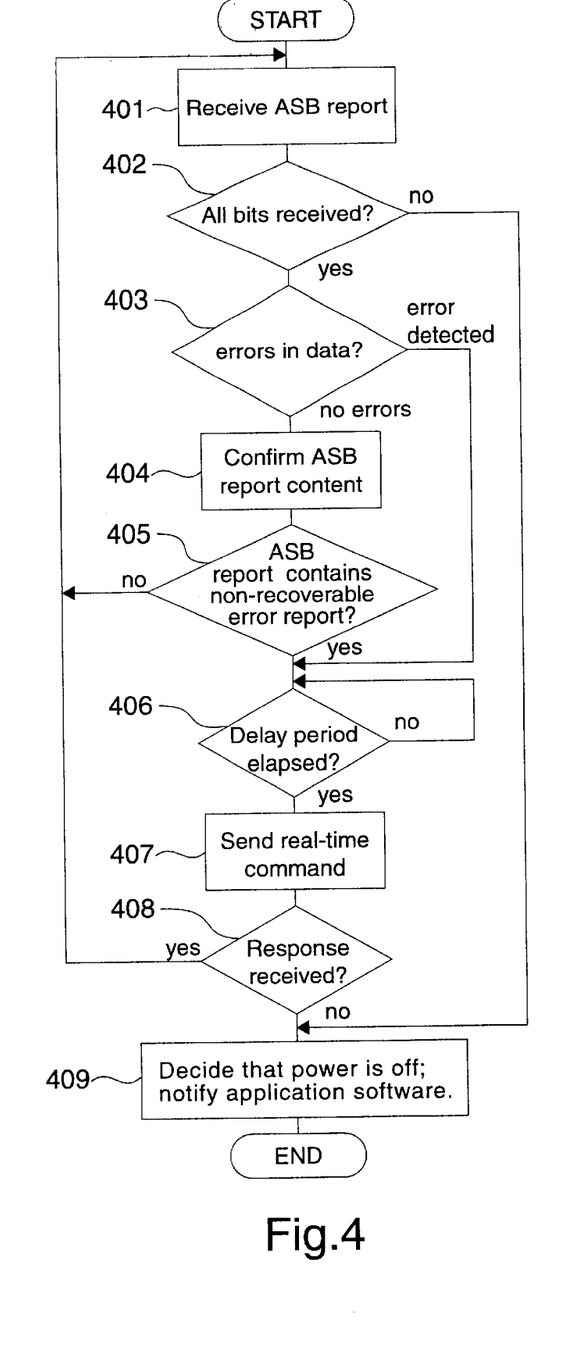
FIG. 4 is a flow chart of control with a power monitoring method according to a third embodiment of the present invention.

FIG. 4 is a flow chart of a power monitoring method according to a third preferred embodiment of the present invention. This method differs from the second embodiment in that in addition to evaluating the content of the ASB report, a further step is provided for handling cases in which an incomplete ASB report is received. This is described in further detail below.

When the printer 20 is in use and the user then turns the printer power off, or some other status-changing event occurs, the ASB function of the printer 20 sends an ASB report to the host computer 10 reporting an error (401), in the same way as in the first and second embodiments. The host computer 10 then leaves the communication port, e.g. in communication interface 126, in a data receive condition for the time needed to receive all data in the ASB report (402). It should be noted that the ASB report has a predetermined length, and is 4 bytes long in this exemplary embodiment.

If the load on the printer power supply is high when the printer power is turned off, the delay time until the power supply voltage has decreased to a level at which the printer can no longer operate can be extremely short. This means that the supply voltage of the printer may drop below the level required for data transmission before all bits in the ASB report can be sent, and data transmission may therefore be terminated with only part of the data sent. It is extremely rare for an ASB report to be interrupted if the power has not been turned off. The evaluation unit 16 of the host computer 10 therefore determines that the printer power has been turned off if the ASB report is not completely received, and so notifies the application software running on the host computer without sending a real-time command to the printer (409). It will be obvious that it is not necessary to further evaluate the status information in the ASB report or to send a real-time command to the printer in this case.

If all bits of the ASB report are received in step 402, the evaluation unit 16 of the host computer 10 performs parity check and checksum operations to determine if there is an error in the received data (403). If a data error is detected, the content of the ASB report cannot be correctly interpreted. Steps 404 and 405 are therefore skipped, and the host computer 10 waits for the specific delay period (406) and then sends a real-time command to the printer 20 (407). If the host computer 10 does not receive a response to the real-time command within a predetermined period (408), it determines that printer power is off, and so notifies the application software running on the host computer (409).

If a data error is not detected in step 403, the host computer 10 reads the status information in the ASB report (404) to determine whether the non recoverable error bit is set (405). The host computer 10 then sends a real-time command only if the non-recoverable error bit is set (406, 407), and determines the printer power to be off if a response is not received from the printer, as described above, (408, 409).

Figure 5:
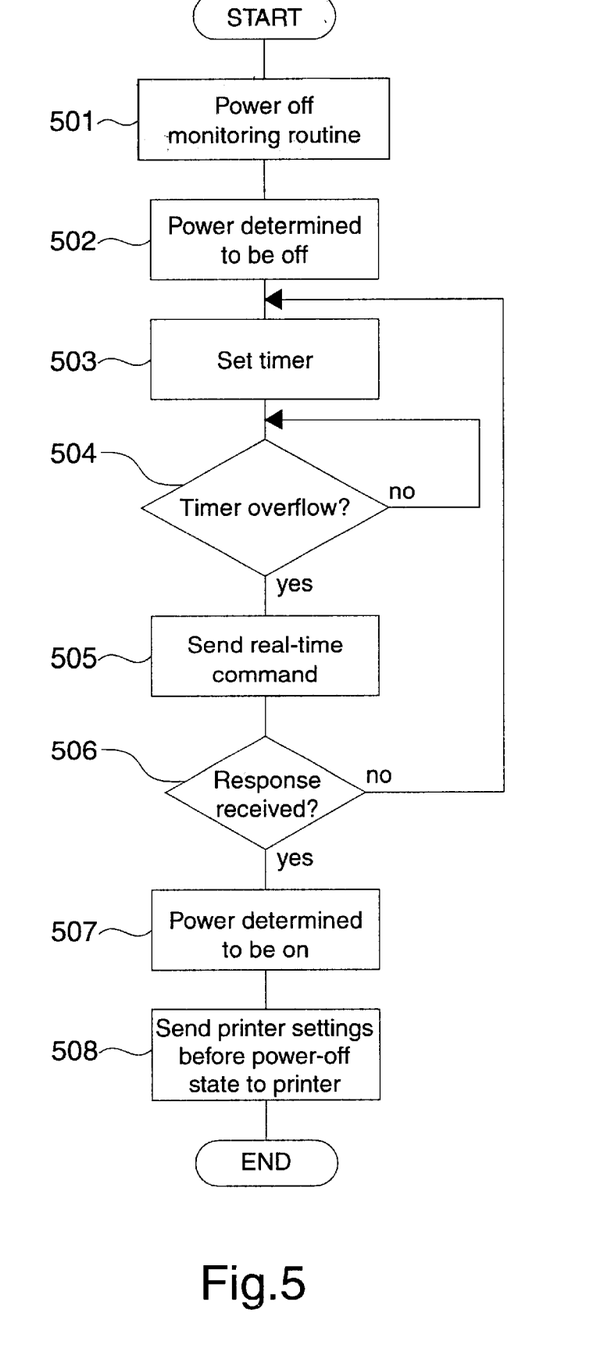
FIG. 5 is a flow chart of host computer control when the host computer detects that power is turned on again after having been turned off.

FIG. 5 is a flow chart of a control method whereby the host computer 10 can detect that printer power has been turned on again after detecting that printer power had been turned off. The method shown in FIG. 5 is applicable to each of the preceding first to third embodiments of the invention.

Whether printer 20 power has been turned off is monitored in step 501 using any of the power monitoring methods described above (501). When the host computer thus determines that printer power is off (502), timer 18 for sending a real-time command is set (503). When a predetermined time interval has elapsed (504), the host computer 10 sends a real-time command to the printer 20 to detect whether the printer 20 power is now on (505). If the printer 20 power is still off, the printer 20 cannot respond to this real-time command. Control therefore loops back to step 503, and the host computer 10 continues to send a real-time command at the predetermined time interval (steps 503 to 506 are repeated) until a response is received from the printer 20.

When a user turns the printer 20 power on again, the printer 20 can respond to the real-time command. When a response is thus received (506), the host computer 10 determines the printer 20 power to be on (507). The host computer 10 then sends to the printer the printer settings in use before printer power was turned off, thereby resetting the printer 20 to its condition before power was turned off (508). The host computer will save these printer settings when it first determines that power has been turned off. While the printer settings are stored in printer memory as long as the printer power is on, they are reinitialized when the printer power is turned off and on. Resending the stored printer settings makes it possible to restore the printer settings and thereby resume printing appropriately.

Each of the methods of the present invention are implemented, in one embodiment, in a software program or programs outlined in the flow diagrams and their accompanying descriptions set forth above. The software program or programs may be resident on the host computer 10, e.g. in ROM 108 or RAM 106, or stored on media such as hard disc 116A, diskette 118A or compact disc 120A, or may be stored at a remote device 124 and input through communications interface 126. The software program for performing the method of the present invention may be embodied on a carrier wave and input to the host computer through communications interface 126.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

For example, a power monitoring method according to the present invention monitors whether the printer power has been turned on again after it was turned off by repeatedly sending a real-time command to the printer at a predetermined time interval. It is also possible, however, to monitor the printer power on status by preceding data transmissions to the printer with a real-time command whenever it is necessary for the host computer to send data to the printer. In other words, the host computer need not send such real-time commands to the printer unless the printer is to be used, i.e., data is to be sent to the printer.

In addition, the ability of the host computer and of the printer to process realtime commands should be understood as according to a preferred implementation of the invention only and not essential to the invention in its broadest aspects.

In addition, the present invention has been described above with reference to a printer, but the invention shall not be so limited and can obviously be also applied to display devices, scanners, and other peripheral devices.

As described above, it is possible by use of a power monitoring method according to the present invention to determine on the host computer side whether printer power is on or off. It is therefore possible to assure printing appropriately even when a printer is reset as a result of printer power being turned off and then on while the printer is in use.

It is also possible by use of the present invention to monitor the printer power status by changing only host computer functions, and not changing printer functions. The power monitoring method of the present invention can therefore be used in existing printer systems with minimal design change.

Power off determinations by the power monitoring method of the present invention are also particularly reliable because a status information request is sent to the printer after waiting a sufficient predetermined time.

Furthermore, the method of the present invention does not request status information except when a non-recoverable error occurs. Demands on the host computer and printer as a result of such requests and required responses are therefore reduced.

Yet further, when all bits in the status information stream are not received, the power monitoring method of the present invention determines that printer power is off without performing a step for requesting status information. Demands on the host computer and printer are therefore reduced as described above.

In addition, a power monitoring method according to the present invention can inform and detect a change in the power on/off status with minimal time lag by using the printer's ASB function and real-time command function for power monitoring.

Thus, the invention described herein is intended to embrace all such alternatives, modifications, applications and variations as may fall within the spirit and scope of the appended claims.

What is claimed is:

1. A method of operating a host computer to monitor a power supply status of a peripheral device capable of sending to the host computer status information resulting from a change in said peripheral device, including a drop in power supply voltage below a specific threshold level, said monitoring method comprising:

(a) receiving the status information sent from the peripheral device;

(b) responsive to receiving the status information sent from the peripheral device, requesting current status information from the peripheral device; and (c) determining that the peripheral device power is off if a response to the current status information request is not received from the peripheral device.

2. The peripheral device power monitoring method as set forth in claim 1, wherein the step of requesting current status information from the peripheral device includes waiting a delay period before requesting current status information, said delay period equivalent at least to the time required for the peripheral device power to turn off after the peripheral device power supply voltage drops below said specific threshold level.

3. The peripheral device power monitoring method as set forth in claim 1 or 2, further comprising:

after receiving status information from the peripheral device, evaluating received status information content to determine if the received status information content relates to a recoverable error; and skipping steps (b) and (c) when the received status information content relates to a recoverable error, excluding a drop in peripheral device power supply voltage below said specific threshold level.

4. The peripheral device power monitoring method as set forth in claim 3 wherein said step of evaluating received status information content includes checking for data errors and if data errors are found proceeding to step (b), and if no data errors are found continuing with said evaluation step to determine if the received status information relates to a recoverable error.

5. The peripheral device power monitoring method as set forth in claim 1 or 2, further comprising:

determining if the status information received from the peripheral is incomplete; and if the status information is incomplete, skipping step (b) and determining that the peripheral device power is off.

6. The peripheral device power monitoring method as set forth in claim 1 or 2, further comprising:

after step (c) of determining that peripheral device power is off, thereafter detecting if power is turned back on.

7. The peripheral device power monitoring method as set forth in claim 6, wherein the step of detecting that peripheral power is turned on comprises:

requesting current status information from the peripheral device; and determining that peripheral device power is on if a response to the current status information request is received.

8. The peripheral device power monitoring method as set forth in claim 7, wherein the step of requesting current status information from the peripheral device is performed before the host computer sends data to the peripheral device.

9. The peripheral device power monitoring method as set forth in claim 7, wherein the step of requesting current status information from the peripheral device is repeated at a specific time interval.

10. A host computer for monitoring a power supply status in a peripheral device capable of sending to the host computer status information resulting from a change in peripheral device, including a drop in peripheral device power supply voltage below a specific threshold level, comprising:

a status information receiving unit that receives status information sent from the peripheral device;

a status information request generator that requests current status information from the peripheral device after said peripheral device status information has been received; and an evaluation unit that determines the peripheral device power is off if a response to the current status information request is not received.

11. A host computer for monitoring a power supply status in a peripheral device as set forth in claim 10, further comprising a timer that times a delay period starting when the status information is initially sent from the peripheral device and said status information request generator responding to expiration of said delay period for requesting current status information from the peripheral device.

12. A system for monitoring a power supply status in a peripheral device comprising a host computer and a peripheral device connected to the host computer, the peripheral device comprising:

a supply voltage detector that detects a supply voltage;

a notification unit responsive to at least said supply voltage detector to send status information to said host computer when the peripheral device status changes, one of said status changes including a drop in peripheral device power below a threshold value; and an execution unit that executes in real-time for responding to a real-time command from the host computer requesting peripheral device status information; said host computer comprising:

a status information receiving unit that receives status information sent from the peripheral device;

a status information request generator that generates a real-time command requesting current status information from the peripheral device after said peripheral device status information has been received; and an evaluation unit that determines the peripheral device power is off if a response to the current status information request is not received.

13. A system for monitoring a power supply status in a peripheral device as set forth in claim 12, wherein said host computer further comprises a timer that times a delay period starting when the status information is initially sent from the peripheral device and said status information request generator responding to expiration of said delay period for requesting current status information from the peripheral device.

14. A system for monitoring a power supply status in a peripheral device as set forth in claim 12, wherein said peripheral device comprises a printer.

15. A computer program embodied on a computer-readable medium for implementing a method of operating a host computer to monitor a power supply status of a peripheral device capable of sending to the host computer status information resulting from a change in said peripheral device, including a drop in power supply voltage below a specific threshold level, said monitoring method comprising:

(a) receiving the status information sent from the peripheral device;

(b) responsive to receiving the status information sent from the peripheral device, requesting current status information from the peripheral device; and (c) determining that the peripheral device power is off if a response to the current status information request is not received from the peripheral device.

16. A computer program embodied on a computer-readable medium for implementing a method of operating a host computer as set forth in claim 15, wherein the step of requesting current status information from the peripheral device includes waiting a delay period before requesting current status information, said delay period equivalent at least to the time required for the peripheral device power to turn off after the peripheral device power supply voltage drops below said specific threshold level.

17. A computer program embodied on a computer-readable medium for implementing a method of operating a host computer as set forth in claim 15 or 16, further comprising:

after receiving status information from the peripheral device, evaluating received status information content to determine if the received status information content relates to a recoverable error; and skipping steps (b) and (c) when the received status information content its relates to a recoverable error, excluding a drop in peripheral device power supply voltage below said specific threshold level.

18. A computer program embodied on a computer-readable medium for implementing a method of operating a host computer as set forth in claim 17 wherein said step of evaluating received status information content includes checking for data errors and if data errors are found proceeding to step (b), and if no data errors are found continuing with said evaluation step to determine if the received status information relates to a recoverable error.

19. A computer program embodied on a computer-readable medium for implementing a method of operating a host computer as set forth in claim 15 or 16, further comprising:

- determining if the status information received from the peripheral is incomplete; and
- if the status information is incomplete, skipping step (b) and determining that the peripheral device power is off.

20. A computer program embodied on a computer-readable medium for implementing a method of operating a host computer as set forth in claim 15 or 16, further comprising:

- after step (c) of determining that peripheral device power is off, thereafter detecting if power is turned back on.

21. A computer program embodied on a computer-readable medium for implementing a method of operating a host computer as set forth in claim 20, wherein the step of detecting that peripheral power is turned on comprises:

- requesting current status information from the peripheral device; and
- determining that peripheral device power is on if a response to the current status information request is received.

22. A computer program embodied on a computer-readable medium for implementing a method of operating a host computer as set forth in claim 21, wherein the step of requesting current status information from the peripheral device is performed before the host computer sends data to the peripheral device.

23. A computer program embodied on a computer-readable medium for implementing a method of operating a host computer as set forth in claim 21, wherein the step of requesting current status information from the peripheral device is repeated at a specific time interval.

24. A computer program embodied in a carrier wave for implementing a method of operating a host computer to monitor a power supply status of a peripheral device capable of sending to the host computer status information resulting from a change in said peripheral device, including a drop in power supply voltage below a specific threshold level, said monitoring method comprising:

(a) receiving the status information sent from the peripheral device;

(b) responsive to receiving the status information sent from the peripheral device, requesting current status information from the peripheral device; and (c) determining that the peripheral device power is off if a response to the current status information request is not received from the peripheral device.

25. A computer program for implementing a method of operating a host computer to monitor a power supply status of a peripheral device capable of sending to the host computer status information resulting from a change in said peripheral device, including a drop in power supply voltage below a specific threshold level, said monitoring method comprising:

(a) receiving the status information sent from the peripheral device;

(b) responsive to receiving the status information sent from the peripheral device, requesting current status information from the peripheral device; and (c) determining that the peripheral device power is off if a response to the current status information request is not received from the peripheral device.

\* \* \* \* \*

UNITED STATES PATENT AND TRADEMARK OFFICE
CERTIFICATE OF CORRECTION

PATENT NO. : 6,389,544 B1
DATED : May 14, 2002
INVENTOR(S) : Masahiro Katagiri

It is certified that error appears in the above-identified patent and that said Letters Patent is hereby corrected as shown below:

<u>Column 12,</u>
Line 63, after "content" delete "its".

Signed and Sealed this

Third Day of December, 2002

JAMES E. ROGAN
*Director of the United States Patent and Trademark Office*